(12) United States Patent
Yount et al.

(10) Patent No.: US 7,858,730 B2
(45) Date of Patent: Dec. 28, 2010

(54) MULTI-LEVEL TUBULAR REACTOR WITH DUAL HEADERS

(75) Inventors: Thomas Lloyd Yount, Kingsport, TN (US); Bruce Roger DeBruin, Lexington, SC (US); Michael Paul Ekart, Kingsport, TN (US); Larry Cates Windes, Kingsport, TN (US); David Allen Sliger, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 624 days.

(21) Appl. No.: 11/776,599

(22) Filed: Jul. 12, 2007

(65) Prior Publication Data

US 2009/0018283 A1    Jan. 15, 2009

(51) Int. Cl.
C08G 63/02 (2006.01)
C08G 63/00 (2006.01)

(52) U.S. Cl. ............... 528/271; 422/129; 422/131; 422/137; 422/138; 526/64; 528/171; 528/176; 528/272; 528/308.1

(58) Field of Classification Search ............. 422/129, 422/131, 137, 138; 526/64; 528/171, 176, 528/271, 272, 308.1
See application file for complete search history.

(56) References Cited

U.S. PATENT DOCUMENTS

| | | |
|---|---|---|
| 1,422,182 A | 7/1922 | Curme |
| 2,361,717 A | 10/1944 | Taylor |
| 2,614,648 A | 10/1952 | Wilson |
| 2,709,642 A | 5/1955 | Mann, Jr. et al. |
| 2,727,882 A | 12/1955 | Vodonik |
| 2,753,249 A | 7/1956 | Idenden et al. |
| 2,820,815 A | 1/1958 | Matuszak et al. |
| 2,829,153 A | 4/1958 | Vodonik |
| 2,905,707 A | 9/1959 | Hurt et al. |
| 2,973,341 A | 2/1961 | Hippe et al. |
| 3,044,993 A | 7/1962 | Tiemersma |
| 3,052,711 A | 9/1962 | Glogau et al. |
| 3,054,776 A | 9/1962 | Higgins |
| 3,110,547 A | 11/1963 | Emmert |
| 3,113,843 A | 12/1963 | Li |
| 3,161,710 A | 12/1964 | Turner |
| 3,174,830 A | 3/1965 | Watzl et al. |
| 3,185,668 A | 5/1965 | Meyer et al. |
| 3,192,184 A | 6/1965 | Brill et al. |
| 3,241,926 A | 3/1966 | Parker et al. |
| 3,250,747 A | 5/1966 | Mitchell, Jr. et al. |
| 3,251,657 A | 5/1966 | Bachmann et al. |
| 3,254,965 A | 6/1966 | Ogle |
| 3,376,353 A | 4/1968 | Tate |
| 3,385,881 A | 5/1968 | Bachmann et al. |
| 3,390,965 A | 7/1968 | Ditmar |
| 3,402,023 A | 9/1968 | Dobo |
| 3,427,287 A | 2/1969 | Pengilly |
| 3,438,942 A | 4/1969 | Scheller |
| 3,442,868 A | 5/1969 | Ogata et al. |
| 3,458,467 A | 7/1969 | Herrle et al. |
| 3,468,849 A | 9/1969 | Rothert |
| 3,480,587 A | 11/1969 | Porter |
| 3,487,049 A | 12/1969 | Busot |
| 3,496,146 A | 2/1970 | Mellichamp, Jr. |
| 3,496,159 A | 2/1970 | Spence |
| 3,496,220 A | 2/1970 | McCarty et al. |
| 3,497,473 A | 2/1970 | Kemkes |
| 3,507,905 A | 4/1970 | Girantet et al. |
| 3,509,203 A | 4/1970 | Michaelis et al. |
| 3,511,615 A | 5/1970 | Roget et al. |
| 3,522,214 A | 7/1970 | Crawford et al. |
| 3,534,082 A | 10/1970 | Armstrong et al. |
| 3,551,396 A | 12/1970 | Lanthier |
| 3,582,244 A | 6/1971 | Siclari et al. |
| 3,590,070 A | 6/1971 | Martin et al. |
| 3,590,072 A | 6/1971 | Leybourne |
| 3,595,846 A | 7/1971 | Rouzier |
| 3,600,137 A | 8/1971 | Girantet et al. |
| 3,609,125 A | 9/1971 | Fujimoto et al. |
| 3,639,448 A | 2/1972 | Matsuzawa et al. |
| 3,644,096 A | 2/1972 | Lewis et al. |
| 3,644,294 A | 2/1972 | Siclari et al. |
| 3,644,483 A | 2/1972 | Griehl et al. |
| 3,646,102 A | 2/1972 | Kobayashi et al. |
| 3,647,758 A | 3/1972 | Ryffel et al. |
| 3,651,125 A | 3/1972 | Lewis et al. |

(Continued)

FOREIGN PATENT DOCUMENTS

BE     780142     3/1972

(Continued)

OTHER PUBLICATIONS

Copending U.S. Appl. No. 11/506,105, filed Aug. 17, 2006, Bruce Roger DeBruin.

(Continued)

*Primary Examiner*—Terressa M Boykin
(74) *Attorney, Agent, or Firm*—Jennifer R. Knight; Bernard J. Graves, Jr.

(57) ABSTRACT

A multi-level tubular reactor operable to facilitate a chemical reaction in a reaction medium flowing therethrough. The tubular reactor can include a plurality of horizontally elongated and vertically spaced tubular members coupled to and extending between a pair of horizontally spaced and vertically elongated headers.

63 Claims, 1 Drawing Sheet

U.S. PATENT DOCUMENTS

| | | | |
|---|---|---|---|
| 3,676,485 A | 7/1972 | Lewis et al. |
| 3,684,459 A | 8/1972 | Tate et al. |
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,002,116 A | 3/1991 | Hoagland et al. |
| 5,037,955 A | 8/1991 | Dighton et al. |
| 5,041,525 A | 8/1991 | Jackson |
| 5,064,935 A | 11/1991 | Jackson et al. |
| 5,110,325 A | 5/1992 | Lerner |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Schaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,599,900 A | 2/1997 | Bhatia |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,174,970 B1 | 1/2001 | Braune |

| | | | |
|---|---|---|---|
| 6,252,034 B1 | 6/2001 | Uenishi et al. | |
| 6,339,031 B1 | 1/2002 | Tan | |
| 6,355,738 B2 | 3/2002 | Nakamachi | |
| 6,359,106 B1 | 3/2002 | Nakamoto et al. | |
| 6,399,031 B1 | 6/2002 | Herrmann et al. | |
| 6,458,916 B1 | 10/2002 | Yamaguchi et al. | |
| 6,545,176 B1 | 4/2003 | Tsay et al. | |
| 6,551,517 B1 | 4/2003 | Sentagnes et al. | |
| 6,576,774 B2 | 6/2003 | Scardino et al. | |
| 6,590,062 B2 | 7/2003 | Yamaguchi et al. | |
| 6,623,643 B2 | 9/2003 | Chisholm et al. | |
| 6,631,892 B1 | 10/2003 | Erickson | |
| 6,642,407 B2 | 11/2003 | Rao et al. | |
| 6,703,454 B2 | 3/2004 | Debruin | |
| 6,723,826 B2 | 4/2004 | Yamaguchi et al. | |
| 6,814,944 B1 | 11/2004 | Matsui et al. | |
| 6,815,525 B2 | 11/2004 | Debruin | |
| 6,861,494 B2 | 3/2005 | Debruin | |
| 6,906,164 B2 | 6/2005 | Debruin | |
| 6,916,939 B2 | 7/2005 | Yamane et al. | |
| 7,008,546 B2 | 3/2006 | Edmondson | |
| 7,049,462 B2 | 5/2006 | Nagare et al. | |
| 7,074,879 B2 | 7/2006 | Debruin et al. | |
| 7,658,817 B2 | 2/2010 | Fukuoka et al. | |
| 2002/0128399 A1 | 9/2002 | Nakamoto et al. | |
| 2002/0161166 A1 | 10/2002 | Nakane et al. | |
| 2002/0180099 A1 | 12/2002 | Keillor, III | |
| 2003/0037910 A1 | 2/2003 | Smyrnov | |
| 2003/0104203 A1 | 6/2003 | Tam et al. | |
| 2003/0133856 A1 | 7/2003 | Le | |
| 2003/0191326 A1 | 10/2003 | Yamane et al. | |
| 2004/0068070 A1 | 4/2004 | Martan et al. | |
| 2004/0197618 A1 | 10/2004 | Harada et al. | |
| 2004/0249111 A1 | 12/2004 | Debruin et al. | |
| 2005/0059782 A1 | 3/2005 | Andrist et al. | |
| 2005/0222371 A1 | 10/2005 | Wilhelm et al. | |
| 2006/0008661 A1 | 1/2006 | Wijesundara et al. | |
| 2006/0251546 A1 | 11/2006 | Yount et al. | |
| 2006/0251547 A1 | 11/2006 | Windes et al. | |
| 2007/0037959 A1 | 2/2007 | DeBruin | |
| 2008/0139760 A1 | 6/2008 | DeBruin | |

FOREIGN PATENT DOCUMENTS

| | | |
|---|---|---|
| BR | 79062279 | 7/1981 |
| DE | 2200832 | 1/1972 |
| DE | 125 798 | 5/1977 |
| DE | 126 073 | 6/1977 |
| DE | 146 298 | 2/1981 |
| DE | 0 105 111 A1 | 7/1983 |
| DE | 206 558 | 2/1984 |
| DE | 229 415 | 11/1985 |
| DE | 4235785 A1 | 5/1994 |
| DE | 195 25 579 | 12/1996 |
| DE | 195 37 930 | 4/1997 |
| DE | 103 36 164 A1 | 3/2005 |
| DE | 10 2004 038 466 | 10/2005 |
| EP | 0 070 707 A1 | 1/1983 |
| EP | 0 105 111 | 7/1983 |
| EP | 0 850 962 A2 | 7/1998 |
| EP | 0 999 228 A2 | 5/2000 |
| EP | 1 065 193 A1 | 1/2001 |
| FR | 2168990 | 9/1973 |
| FR | 2302778 A1 | 3/1975 |
| GB | 777 128 | 6/1957 |
| GB | 777 628 | 6/1957 |
| GB | 1001787 | 8/1965 |
| GB | 1013034 | 12/1965 |
| GB | 1055918 | 1/1967 |
| GB | 1122538 | 8/1968 |
| GB | 1154538 | 6/1969 |
| GB | 1 277 376 | 6/1972 |
| GB | 1320769 | 6/1973 |
| GB | 2010294 | 6/1979 |
| GB | 2020194 | 11/1979 |
| GB | 2 052 535 | 1/1981 |
| GB | 2052535 | 1/1981 |
| JP | 42 4993 B | 3/1967 |
| JP | 42 18353 B | 9/1967 |
| JP | 47 39043 A | 4/1971 |
| JP | 48 94795 A | 12/1973 |
| JP | 49 28698 A | 3/1974 |
| JP | 49 34593 A | 3/1974 |
| JP | 49 105893 A | 10/1974 |
| JP | 50 82197 A | 7/1975 |
| JP | 51 29460 A | 3/1976 |
| JP | 51 100036 A | 9/1976 |
| JP | 51 136788 A | 11/1976 |
| JP | 51 136789 A | 11/1976 |
| JP | 52 51495 A | 4/1977 |
| JP | 52 71432 A | 6/1977 |
| JP | 52 78845 A | 7/1977 |
| JP | 52 83424 A | 7/1977 |
| JP | 52 87133 A | 7/1977 |
| JP | 53 31793 A | 3/1978 |
| JP | 53 34894 A | 3/1978 |
| JP | 54 41833 A | 4/1979 |
| JP | 54 76535 A | 6/1979 |
| JP | 54 79242 A | 6/1979 |
| JP | 54 100494 A | 8/1979 |
| JP | 54 157536 A | 12/1979 |
| JP | 55 43128 A | 3/1980 |
| JP | 55 108422 A | 8/1980 |
| JP | 55 135133 A | 10/1980 |
| JP | 58 129020 A | 8/1983 |
| JP | 59 47226 A | 3/1984 |
| JP | 59 53530 A | 4/1984 |
| JP | 59 68326 A | 4/1984 |
| JP | 59 71326 A | 4/1984 |
| JP | 60 15421 A | 1/1985 |
| JP | 60 72845 A | 4/1985 |
| JP | 60 115551 A | 6/1985 |
| JP | 60 120839 A | 6/1985 |
| JP | 60 163918 A | 8/1985 |
| JP | 60 226846 A | 11/1985 |
| JP | 62 207325 A | 9/1987 |
| JP | 62 292831 A | 12/1987 |
| JP | 64 56726 A | 3/1989 |
| JP | 1 102044 A | 4/1989 |
| JP | 3 192118 A | 8/1991 |
| JP | 3 292323 A | 12/1991 |
| JP | 5-78402 | 3/1993 |
| JP | 5 155994 A | 6/1993 |
| JP | 6 247899 A | 9/1994 |
| JP | 7 118208 A | 5/1995 |
| JP | 7 173268 A | 7/1995 |
| JP | 7 238151 A | 9/1995 |
| JP | 7 313 865 | 12/1995 |
| JP | 8 198960 A | 8/1996 |
| JP | 8 283398 A | 10/1996 |
| JP | 10 36495 A | 2/1998 |
| JP | 10 259244 A | 9/1998 |
| JP | 11 092555 A | 4/1999 |
| JP | 11 106489 A | 4/1999 |
| JP | 11 217429 A | 8/1999 |
| JP | 2000/095851 A | 4/2000 |
| JP | 2004 238329 | 8/2004 |
| KR | 1993-0005144 B1 | 6/1993 |
| KR | 1994-0011540 B1 | 3/1994 |
| NL | 6704303 | 9/1967 |
| PL | 136188 | 8/1987 |
| SU | 973552 | 11/1982 |
| WO | 95/29752 | 11/1995 |
| WO | WO 96/22318 | 7/1996 |
| WO | WO 98/08602 | 3/1998 |
| WO | WO 98/10007 | 3/1998 |

| WO | WO 99/16537 | 4/1999 |
| WO | 99/39815 | 8/1999 |
| WO | WO 02/26841 A1 | 2/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,597, filed Jul. 12, 2007, Bruce Roger DeBruin.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,600, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/776,591, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, $6^{th}$ Edition, McGraw-Hill, United States.
Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.
Perry, Robert H. and Green, Don, "Fluid and Particle Mechanics," Perry's Chemical Engineer's Handbook, 1984, 14-82 to 14-95, $6^{th}$ Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Phenomena I: Pipe Flow," The Phenomena of Fluid Motions, 1967, pp. 456-538, Addison-Wesley Publishing Company, United States.
Gupta, S.K. and Kumar, Anil, "Polyester Reactors," Plenum Chemical Engineering Series, 1987, Chapter 8, pp. 241-318, Plenum Press, New York.
Stahl, Wegmann, Von Rohr; Tubular Reactor for Liquid Reactions with Gas Release, 2003, Catalysis Today, 79-80, pp. 89-95.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
USPTO Office Action dated Jul. 18, 2008 for copending U.S. Appl. No. 11/506,346.
Ekivana, N.I. et al., "Structure Formation in Terephthalic Acid Pastes," 1968, Chemical Abstracts Service, Columbus, OH.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Notice of Allowance dated Jan. 2, 2009 for copending U.S. Appl. No. 11/891,149.
USPTO Notice of Allowance dated Jan. 28, 2009 for copending U.S. Appl. No. 11/506,346.
USPTO Office Action dated Jan. 30, 2009 for copending U.S. Appl. No. 11/715,546.
USPTO Office Action dated Feb. 4, 2009 for copending U.S. Appl. No. 11/635,411.

USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
Perry's Chemical Engineers' Handbook, 7th Edition, pp. 8-49 to 8-50 and pp. 14-82 to 14-95, 1997, The McGraw-Hill Companies, Inc., United States.
USPTO Notice of Allowance dated Nov. 17, 2009 for copending U.S. Appl. No.12/173,354.
USPTO Office Action dated Feb. 18, 2010 for copending U.S. Appl. No. 11/776,597.
USPTO Office Action dated Feb. 18, 2010 for copending U.S. Appl. No. 11/776,600.
USPTO Office Action dated Feb. 18, 2010 for copending U.S. Appl. No. 11/776,587.
USPTO Office Action dated Feb. 18, 2010 for copending U.S. Appl. No. 11/776,603.
USPTO Office Action dated Feb. 18, 2010 for copending U.S. Appl. No. 11/776,591.
USPTO Office Action dated Feb. 24, 2010 for copending U.S. Appl. No. 11/776,598.
USPTO Office Action dated Feb. 24, 2010 for copending U.S. Appl. No. 11/776,595.
USPTO Office Action dated Jan. 11, 2010 for copending U.S. Appl. No. 11/635,360.
USPTO Office Action dated Jan. 20, 2010 for copending U.S. Appl. No. 12/186,739.
International Search Report and Written Opinion for PCT/US2008/008337, dated Oct. 23, 2008.
USPTO Notice of Allowance dated Jun. 23, 2010 in copending U.S. Appl. No. 11/776,595.
USPTO Notice of Allowance dated Jun. 23, 2010 in copending U.S. Appl. No. 11/776,598.
USPTO Notice of Allowance dated Jun. 23, 2010 in copending U.S. Appl. No. 11/776,597.
USPTO Notice of Allowance dated Jun. 24, 2010 in copending U.S. Appl. No. 11/776,603.
USPTO Notice of Allowance dated Jun. 25, 2010 in copending U.S. Appl. No. 11/776,591.
USPTO Notice of Allowance dated Jun. 28, 2010 in copending U.S. Appl. No. 11/776,600.
USPTO Notice of Allowance dated Jul. 14, 2010 in copending U.S. Appl. No. 11/715,564..
USPTO Notice of Allowance dated Jul. 15, 2010 in copending U.S. Appl. No. 11/776,587.
USPTO Notice of Allowance dated Jul. 23, 2010 in copending U.S. Appl. No. 12/186,739.
USPTO Supplementary Notice of Allowance dated Sep. 21, 2010 in copending U.S. Appl. No. 11/715,564.

MULTI-LEVEL TUBULAR REACTOR WITH DUAL HEADERS

BACKGROUND OF THE INVENTION

1. Field of the Invention

This invention relates to reactors for processing liquid-containing reaction mediums. In another aspect, the invention concerns polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Thus, a need exists for a high efficiency polyester process that minimizes capital, operational, and maintenance costs while maintaining or enhancing product quality.

SUMMARY OF THE INVENTION

In one embodiment of the present invention, there is provided a process comprising subjecting a reaction medium to a chemical reaction in a reactor comprising a pair of horizontally spaced vertically elongated headers and a plurality of vertically spaced horizontally elongated tubular members coupled to and extending generally between the headers. The reaction medium flows through the headers and the tubular members as the reaction medium travels through the reactor.

In another embodiment of the present invention, there is provided a process for making polyethylene terephthalate (PET), the process comprising: (a) introducing a polycondensation feed into a polycondensation reactor, wherein the polycondensation feed forms a predominately liquid reaction medium in the reactor, wherein the polycondensation feed comprises PET having an average chain length in the range of from about 5 to about 50; (b) subjecting the reaction medium to polycondensation in the reactor, wherein the reactor comprises a pair of horizontally spaced vertically elongated headers and a plurality of vertically spaced horizontally elongated pipes coupled to and extending generally between the headers, wherein the reaction medium flows through the headers and the pipes as the reaction medium travels through the reactor, wherein the reaction medium flows in generally opposite directions in vertically adjacent ones of the pipes, wherein the reaction medium flows downwardly through the headers as the reaction medium travels from one of the pipes to another of the pipes; and (c) recovering a predominately liquid polycondensation product from the reactor, wherein the polycondensation product comprises PET having an average chain length that is at least about 10 greater than the average chain length of the PET in the polycondensation feed.

In a further embodiment of the present invention, there is provided a reactor for processing a reaction medium flowing therethrough. The reactor comprises a pair of horizontally spaced vertically elongated headers, a plurality of vertically spaced horizontally elongated tubular members coupled to and extending generally between the headers, and a plurality of flow diverters at least partly disposed in the headers. Each of the tubular members has an inlet located at one of the headers and an outlet located at the other of the headers. The flow diverters are configured to direct the flow of the reaction medium downwardly from the outlet of one of the tubular members to the inlet of another of the tubular members.

BRIEF DESCRIPTION OF THE DRAWINGS

Certain embodiments of the present invention are described in detail below with reference to the enclosed FIGURE, wherein.

DETAILED DESCRIPTION

Figure 1:
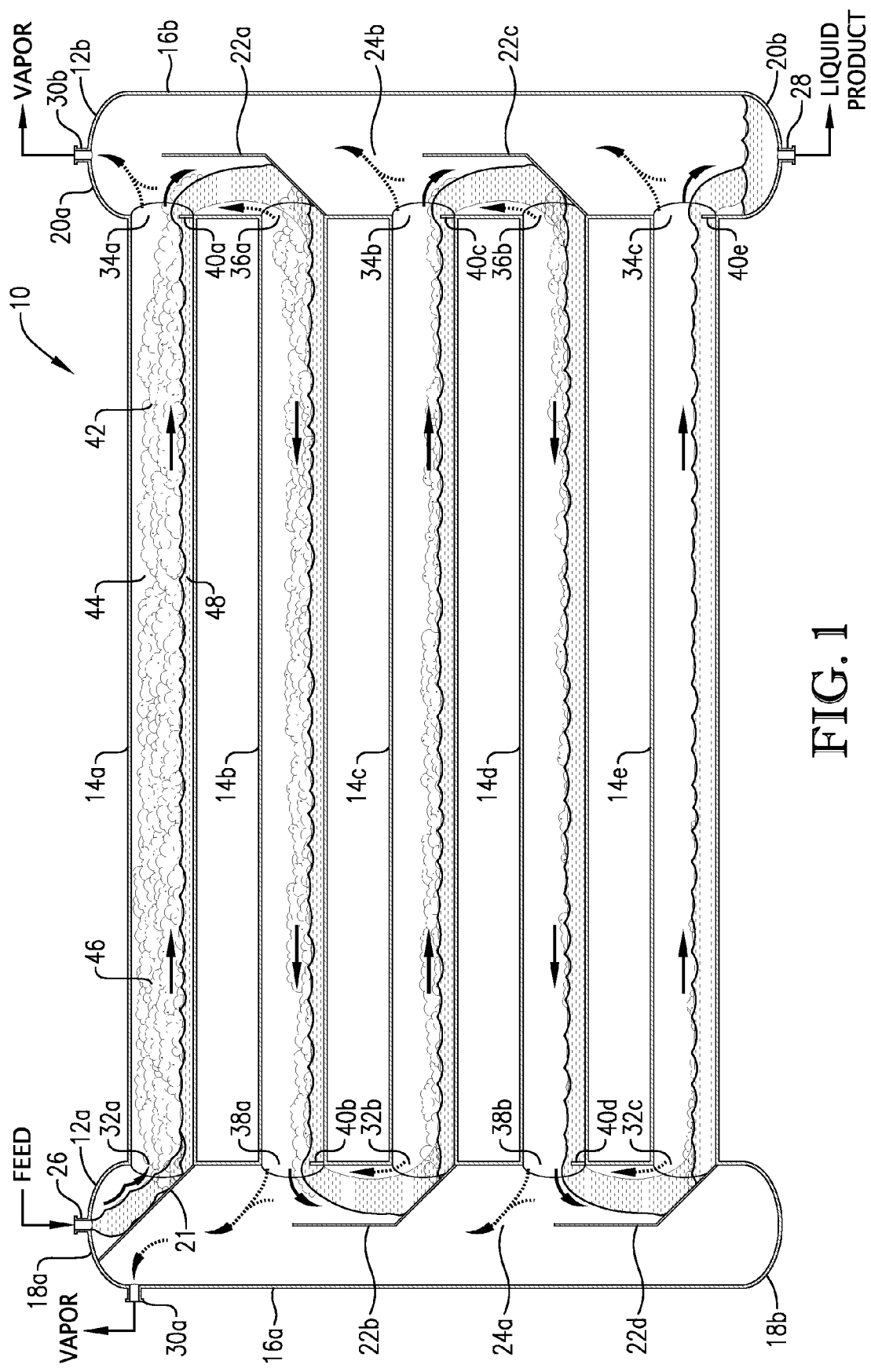
FIG. 1 is a schematic depiction of a multi-level tubular reactor configured in accordance with one embodiment of the present invention and suitable for use as a polycondensation reactor in a melt-phase polyester production facility.

FIG. 1 illustrates an exemplary multi-level tubular reactor configured in accordance with one embodiment of the present invention. The configuration and operation of the reactor depicted in FIG. 1 are described in detail below. Although certain portions of the following description relate primarily to reactors employed in a melt-phase polyester production process, reactors configured in accordance with embodiments of the present invention may find application in a wide variety of chemical processes. For example, reactors configured in accordance with certain embodiments of the present invention may be advantageously employed in any process where chemical reactions take place in the liquid phase of a reaction medium and a vapor byproduct is produced as a result of the chemical reaction. Further, reactors configured in accordance with certain embodiments of the present invention may be advantageously employed in chemical processes where at least a portion of the reaction medium forms foam during processing.

Referring now to FIG. 1, one embodiment of a multi-level tubular reactor 10 is illustrated as generally comprising a pair of horizontally spaced vertically elongated headers 12a,b and a series of horizontally elongated vertically spaced tubular members 14a-e coupled to and extending generally between headers 12a,b.

Headers 12a,b generally comprise an upright tubular shell 16a,b, a pair of end caps 18a,b and 20a,b coupled to opposite ends of shells 16a,b, a feed diverter 21 disposed in header 12a, and a plurality of flow diverters 22a-d disposed in headers 12a,b. A first vapor gap 24a is defined between flow diverters 22b and 22d, while a second vapor gap 24b is defined between flow diverters 22a and 22c. A feed inlet 26 is defined in upper end cap 18a of header 12a. A liquid product outlet 28 is defined in lower end cap 20b of header 12b. Vapor outlets 30a,b are defined near the tops of headers 12a,b.

Headers 12a,b each define a plurality of generally aligned openings that provide fluid communication between the internal volume of headers 12a,b and the series of tubular members 14a-e coupled and extending between headers 12a,b.

In the embodiment illustrated in FIG. 1, shells 16a,b of headers 12a,b are substantially identical, substantially vertical, substantially cylindrical pipes. In an alternative embodiment, shells 16a,b can be vertically elongated tubular members having a variety of cross-sectional configurations (e.g., rectangular, square, or oval). Further, shells 16a,b need not have a perfectly vertical orientation. For example, the central axis of elongation of shells 16a,b can extend within about 30, about 15, or 5 degrees of vertical.

In the embodiment illustrated in FIG. 1, headers 12a,b have a maximum internal height (H) that is greater than their maximum internal width (W). In one embodiment, headers 12a,b have a height-to-width (H:W) ratio in the range of from about 2:1 to about 20:1, about 4:1 to about 15:1, or 5:1 to 10:1. In one embodiment, H is in the range of from about 8 to about 100 feet, about 10 to about 75 feet, or 20 to 50 feet, and W is in the range of from about 1 to about 20 feet, about 2 to about 10 feet, or 3 to 5 feet.

In the embodiment illustrated in FIG. 1, the series of tubular members 14a-e are directly coupled to and extend generally between headers 12a,b. The series of tubular members 14a-e includes an uppermost tubular member 14a, a plurality of intermediate tubular members 14b-d, and a lowermost tubular member 14e. Each tubular member 14a-e has one end directly coupled to header 12a and the other end directly coupled to header 12b. Tubular members 14a,c,e each have an inlet 32a,b,c located at and in fluid communication with header 12a and an outlet 34a,b,c located at and in fluid communication with header 12b. Tubular members 14b,d each have an inlet 36a,b located at and in fluid communication with header 12b and an outlet 38a,b located at and in fluid communication with header 12a. Reactor 10 can, optionally, employ weirs 40a-e couple to and extending upwardly from the bottom of tubular members 14a-e proximate their respective outlets 34a, 38a, 34b, 38b, and 34c.

In the embodiment illustrated in FIG. 1, tubular members 14a-e are substantially horizontal, substantially cylindrical pipes. In an alternative embodiment, tubular members 14a-e can have a variety of cross-sectional shapes (e.g., rectangular, square, or oval). Further, tubular members 14a-e need not have a perfectly horizontal orientation. For example, the central axis of elongation of tubular members 14a-e can extend within about 30, about 15, or 5 degrees of horizontal.

In the embodiment illustrated in FIG. 1, each tubular member 14a-e has a maximum internal length (L) that is greater than its maximum internal diameter (D). In one embodiment, each tubular member 14a-e has a length-to-diameter (L:D) ratio in the range of from about 2:1 to about 50:1, about 5:1 to about 20:1, or 8:1 to 15:1. In one embodiment, L is in the range of from about 10 to about 200 feet, about 20 to about 100 feet, or 30 to 50 feet, and D is in the range of from about 1 to about 20 feet, about 2 to about 10 feet, or 3 to 5 feet. In one embodiment, the ratio of the diameter (D) of one or more of tubular members 14a-e to the maximum internal width (W) of one or both of headers 12a,b is in the range of from about 0.1:1 to about 2:1, about 0.25:1 to about 1:1, or 0.4:1 to 0.9:1. In the embodiment illustrated in FIG. 1, each tubular member 14a-e has a substantially identical configuration. In an alternative embodiment, tubular members 14a-e can have different lengths, different diameters, and/or different orientations.

In operation, a feed, which can be in a predominately liquid form, is introduced into reactor 10 via feed inlet 26 of header 12a and is directed to inlet 32a of uppermost tubular member 14a via feed diverter 21. In uppermost tubular member 14a, the feed forms a reaction medium 42 that flows generally horizontally on the bottom of tubular member 14a from inlet 32a to outlet 34a. As reaction medium 42 flows through tubular member 14a, a chemical reaction takes place within reaction medium 42. A vapor 44 can be formed in tubular member 14a. Vapor 44 can comprise a byproduct of the chemical reaction carried out in tubular member 14a and/or a volatile component of the feed to tubular member 14a. At least a portion of vapor 44 is disengaged from and flows generally over reaction medium 42 as reaction medium 42 flows through tubular member 14a.

As depicted in FIG. 1, in one embodiment of the present invention, the chemical reaction carried out in reactor 10 causes foaming of reaction medium 42, thereby producing a foam portion 46 and a predominately liquid portion 48 of reaction medium 42. The chemical reaction can take place in the liquid of both foam portion 46 and predominately liquid portion 48. In fact, the presence of foam can actually enhance certain chemical reactions, especially those reactions that are facilitated by increased liquid surface area and reduced pressure. Thus, in one embodiment of the present invention, the internal volume and flow area of tubular members 14a-e are sufficiently large so that the maximum amount of foam formation is permitted. As depicted in FIG. 1, the amount of foam produced by the reaction may decrease as reaction medium 42 progresses through reactor 10. Thus, the portion of reaction medium 42 located in uppermost tubular member 14a may comprise more than 50, 75, or 90 volume percent gas, while the portion of reaction medium 42 located in lowermost tubular member 14e may comprise less than 20, 10, or 5 volume percent gas.

Referring again to FIG. 1, after flowing through uppermost tubular member 14a, reaction medium 42 passes out of uppermost tubular member 14a via outlet 34a. If weir 40a is employed, reaction medium 42 flows over the top of, around the edges of, through openings in, and/or under weir 40a as it exits tubular member 14a and enters the internal volume of header 12b. Weirs 40a-e can be employed in reactor 10 to help maintain the desired depth of reaction medium 42 in tubular members 14a-e. In one embodiment of the present invention, the maximum depth of the predominately liquid portion 48 of reaction medium 42 in each tubular member 14a-e is less than about 0.8D, less than about 0.4D, or less than 0.25D, where D is the maximum vertical dimension of the respective tubular member 14a-e.

As reaction medium 42 passes out of tubular member 14a and flows downwardly into header 12b, vapor 44 flows upwardly into header 12b. In header 12b, vapor 44 from uppermost tubular member 14a can be combined with the vapor produced in tubular members 14b-e. The resulting combined vapor can exit header 12b via vapor outlet 30b. Upon exiting tubular member 14a, reaction medium 42 flows downwardly in header 12b and is directed by flow diverter 22a to inlet 36a of tubular member 14b.

In tubular member 14b, reaction medium 42 flows generally horizontally on the bottom of tubular member 14b from inlet 36a to outlet 38a, as the chemical reaction in reaction medium 42 proceeds. As depicted in FIG. 1, the direction of flow though tubular member 14b is substantially opposite to the direction of flow through tubular member 14a. After flowing through tubular member 14b, reaction medium 42 passes out of tubular member 14b via outlet 38a. If weir 40b is employed, reaction medium 42 flows over the top of, around the edges of, through openings in, and/or under weir 40b as it exits tubular member 14b and enters the internal volume of header 12a. As reaction medium 42 passes out of tubular member 14b and flows downwardly into header 12a, the vapor byproduct generated in tubular member 14b flows upwardly into header 12a. In header 12a, the vapor from tubular member 14b can be combined with the vapor produced in tubular members 14c-e. The resulting combined vapor can exit header 12a via vapor outlet 30a. Upon exiting tubular member 14b, reaction medium 42 flows downwardly in header 12a and is directed by flow diverter 22b to inlet 32b of tubular member 14c.

The flow of reaction medium 42 through the remaining tubular members 14c-e can proceed substantially the same as described above with reference to flow through tubular members 14a,b. In summary, reaction medium 42 proceeds back-and-forth though reactor 10 as it passes through tubular members 14a-e. Reaction medium 42 passes downwardly between vertically adjacent tubular members via flow diverters 22a-d in headers 12a,b. When reaction medium 42 exits lowermost tubular member 14e it collects in the bottom of header 12b. This final reaction medium 42 is withdrawn from header 12b as a predominately liquid product via liquid product outlet 28.

Multi-level tubular reactors configured in accordance with certain embodiments of the present invention require little or no mechanical agitation of the reaction medium processed therein. Although the reaction medium processed in the multi-level tubular reactor may be somewhat agitated by virtue of foaming, flowing through the reactor segments, and falling from one reactor segment to another, this foaming agitation, flow agitation, and gravitational agitation is not mechanical agitation. In one embodiment of the present invention, less than about 50 percent, less than about 25 percent, less than about 10 percent, less than about 5 percent, or 0 percent of the total agitation of the reaction medium processed in the multi-level tubular reactor is provided by mechanical agitation. Thus, reactors configured in accordance with certain embodiments of the present invention can operate without any mechanical mixing devices. This is in direct contrast to conventional continuous stirred tank reactors (CSTRs) which employ mechanical agitation almost exclusively.

As indicated above, multi-level tubular reactors configured in accordance with embodiments of the present invention reactors can be used in a variety of chemical processes. In one embodiment, a multi-level tubular reactor configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexane-dimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphtalane 2,6-dicarboxylate, 2,6-dihydroxymethyl-decahydronaphthalene, hydroquinone, hydroxybenzoic acid, and mixtures thereof.

Both the esterification stage and the polycondensation stage of a melt-phase polyester production process can include multiple steps. For example, the esterification stage can include an initial esterification step for producing a partially esterified product that is then further esterified in a secondary esterification step. Also, the polycondensation stage can include a prepolymerization step for producing a partially condensed product that is then subjected to a finishing step to thereby produce the final polymer product.

Reactors configured in accordance with certain embodiments of the present invention can be employed in a melt-phase polyester production system as a secondary esterification reactor for carrying out a secondary esterification step, as a prepolymer reactor for carrying out a prepolymerization step, and/or as a finisher reactor for carrying out a finishing step. A detailed description of the process conditions for the present invention employed as an esterification reactor, a prepolymer reactor, and/or a finisher reactor is given below with reference to FIG. 1. It is understood that reactors configured in accordance with embodiments of the present invention can generally be employed as esterification reactors, prepolymer reactors, and/or finisher reactors and that these process conditions are not limited to the embodiment described in FIG. 1, Referring again to FIG. 1, when reactor 10 is employed as a secondary esterification reactor in a melt-phase polyester production process (e.g., a process for making PET), more than one chemical reaction can be carried out in reactor 10. For example, although esterification may be the primary chemical reaction carried out in reactor 10, a certain amount of polycondensation may also occur in reactor 10. When reactor 10 is employed as a secondary esterification reactor, the feed introduced into feed inlet 26 of header 12a can have a conversion in the range of from about 70 to about 95 percent, about 75 to about 90 percent, or 80 to 88 percent, while the predominately liquid product withdrawn from liquid product outlet 28 of header 12b can have a conversion of at least about 80 percent, at least about 90 percent, at least about 95 percent, or at least 98 percent. When reactor 10 is employed as a secondary esterification reactor, the chemical reaction(s) carried out in reactor 10 can increase the conversion of reaction medium 42 by at least about 2 percentage points, at least about 5 percentage points, or at least 10 percentage points between feed inlet 26 and liquid product outlet 28. Further, the average chain length of the feed introduced into feed inlet 26 can be less than about 5, less than about 2 or less than 1, while the predominately liquid product withdrawn from liquid product outlet 28 can have an average chain length in the range of from about 1 to about 20, about 2 to about 12, or 5 to 12. Generally, when reactor 10 is employed as a secondary esterification reactor, the average chain length of reaction medium 42 can increase in the range of from about 1 to about 20, about 2 to about 15, or 5 to 12 between feed inlet 26 and liquid product outlet 28.

When reactor 10 is employed as a secondary esterification reactor, the feed to reactor 10 can enter feed inlet 26 at a temperature in the range of from about 180 to about 350° C., about 215 to about 305° C., or 260 to 290° C. The predominately liquid product exiting liquid product outlet 28 can have a temperature within about 50° C., 25° C., or 10° C. of the temperature of the feed entering feed inlet 26. In one embodiment, the temperature of the liquid product exiting liquid product outlet 28 can be in the range of from about 180 to about 350° C., about 215 to about 305° C., or 260 to 290° C. In one embodiment, the average temperature of reaction medium 42 in reactor 10 is in the range of from about 180 to about 350° C., about 215 to about 305° C., or 260 to 290° C. The average temperature of reaction medium 42 is the average of at least three temperature measurements taken at equal spacings along the primary flow path of reaction medium 42 through reactor 10, where the temperature measurements are each taken near the cross sectional centroid of predominately liquid portion 66 of reaction medium 42 (as opposed to near the wall of the reactor or near the upper surface of the predominately liquid portion). When reactor 10 is employed as a secondary esterification reactor, the vapor space pressure in reactor 10 (measured at vapor outlets 30a and/or 30b) can be maintained at less than about 70 psig, in the range of from about −4 to about 10 psig, or in the range of from 2 to 5 psig.

When reactor 10 is employed as a secondary esterification reactor, it may be desirable to heat the feed prior to introduction into reactor 10 and/or it may be desirable to heat reaction medium 42 as it flows through reactor 10. The heating of the feed prior to introduction into reactor 10 can be carried out in a conventional heat exchanger such as, for example, a shell-and-tube heat exchanger. The heating of reaction medium 42 in reactor 10 can be carried out by external heating devices that contact reactor 10, but do not extend into the interior of reactor 10. Such external heat exchange devices include, for example, jacketing and/or heat-tracing. Generally, the cumulative amount of heat added to the feed immediately upstream of reactor 10 plus the heat added to reaction medium 42 in reactor 10 can be in the range of from about 100 to about 5,000 BTU per pound of reaction medium (BTU/lb), in the range of from about 400 to about 2,000 BTU/lb, or in the range of from 600 to 1,500 BTU/lb.

Referring again to FIG. 1, when reactor 10 is employed as a prepolymer reactor in a melt-phase polyester production process (e.g., a process for making PET), more than one chemical reaction can be carried out in reactor 10. For example, although polycondensation may be the predominate chemical reaction carried out in reactor 10, a certain amount of esterification may also occur in reactor 10. When reactor 10 is employed as a prepolymer reactor, the average chain length of the feed introduced into feed inlet 26 can be in the range of from about 1 to about 20, about 2 to about 15, or 5 to 12, while the average chain length of the predominately liquid product withdrawn from liquid product outlet 28 can be in the range of from about 5 to about 50, about 8 to about 40, or 10 to 30. When reactor 10 is employed as a prepolymerization reactor, the chemical reaction carried out in reactor 10 can cause the average chain length of reaction medium 42 to increase by at least about 2, in the range of from about 5 to about 30, or in the range of from 8 to 20 between feed inlet 26 and liquid product outlet 28.

When reactor 10 is employed as a prepolymer reactor, the feed can enter feed inlet 26 at a temperature in the range of from about 220 to about 350° C., about 265 to about 305° C., or 270 to 290° C. The predominately liquid product exiting liquid product outlet 28 can have a temperature within about 50° C., 25° C., or 10° C. of the temperature of the feed entering feed inlet 26. In one embodiment, the temperature of the liquid product exiting liquid product outlet 28 is in the range of from about 220 to about 350° C., about 265 to about 305° C., or 270 to 290° C. In one embodiment, the average temperature of reaction medium 42 in reactor 10 is in the range of from about 220 to about 350° C., about 265 to about 305° C., or 270 to 290° C. When reactor 10 is employed as a prepolymer reactor, the vapor space pressure in reactor 10 (measured at vapor outlets 30a and/or 30b) can be maintained in the range of from about 0 to about 300 torr, in the range of from about 1 to about 50 torr, or in the range of from 20 to 30 torr.

When reactor 10 is employed as a prepolymer reactor, it may be desirable to heat the feed prior to introduction into reactor 10 and/or it may be desirable to heat reaction medium 42 as it flows through reactor 10. Generally, the cumulative amount of heat added to the feed immediately upstream of reactor 10 plus the heat added to reaction medium 42 in reactor 10 can be in the range of from about 100 to about 5,000 BTU/lb, in the range of from about 400 to about 2,000 BTU/lb, or in the range of from 600 to 1,500 BTU/lb.

Referring again to FIG. 1, when reactor 10 is employed as a finisher reactor in a melt-phase polyester production process (e.g., a process for making PET), the average chain length of the feed introduced into feed inlet 26 can be in the range of from about 5 to about 50, about 8 to about 40, or 10 to 30, while the average chain length of the predominately liquid product withdrawn from liquid product outlet 28 can be in the range of from about 30 to about 210, about 40 to about 80, or 50 to 70. Generally, the polycondensation carried out in reactor 10 can cause the average chain length of reaction medium 42 to increase by at least about 10, at least about 25, or at least 50 between feed inlet 26 and liquid product outlet 28.

When reactor 10 is employed as a finisher reactor, the feed can enter feed inlet 26 at a temperature in the range of from about 220 to about 350° C., about 265 to about 305° C., or 270 to 290° C. The predominately liquid product exiting liquid product outlet 28 can have a temperature within about 50° C., 25° C., or 10° C. of the temperature of the feed entering feed inlet 26. In one embodiment, the temperature of the liquid product exiting liquid product outlet 28 is in the range of from about 220 to about 350° C., about 265 to about 305° C., or 270 to 290° C. In one embodiment, the average temperature of reaction medium 42 in reactor 10 is in the range of from about 220 to about 350° C., about 265 to about 305° C., or 270 to 290° C. When reactor 10 is employed as a finisher reactor, the vapor space pressure in reactor 10 (measured at vapor outlets 30a and/or 30b) can be maintained in the range of from about 0 to about 30 torr, in the range of from about 1 to about 20 torr, or in the range of from 2 to 10 torr.

Reactors configured in accordance with embodiments of the present invention can provide numerous advantages when employed as reactors in the esterification and/or polycondensation stages of a polyester production process. Such reactors can be particularly advantageous when employed as secondary esterification, prepolymer, and/or finisher reactors in a process for making PET. Further, such reactors are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising subjecting a reaction medium to a chemical reaction in a reactor comprising a pair of horizontally spaced vertically elongated headers and a plurality of vertically spaced horizontally elongated tubular members coupled to and extending generally between the headers. The reaction medium flows through the headers and the tubular members as the reaction medium travels through the reactor.

In one example, the headers extend substantially vertically (i.e., the central axis of elongation for each of the headers is essentially vertical). Alternatively, at least one of the headers can extend within about 30, about 15, or 5 degrees of vertical. In one example, the tubular members extend essentially horizontally. (i.e., the central axis of elongation of the tubular members is essentially horizontal). Alternatively the tubular members can extend within about 30, about 15, or 5 degrees of horizontal. In another example, the reactor comprises no mechanical mixing device.

In one example, the reaction medium flows generally horizontally through the tubular members. In another example, the reaction medium flows in generally opposite directions in vertically adjacent ones of the tubular members. In one example, the reaction medium flows downwardly through at least one of the headers as it travels from an upper to a lower one of the tubular members.

In one example, the chemical reaction generates a vapor byproduct. At least a portion of the vapor byproduct generated in at least two, at least three, at least four, at least five, at least six, at least seven, or more tubular members is combined in at least one of the headers and exits a vapor outlet located near the top of at least one of the headers. In another example, the liquid product exits the reactor near the bottom of at least one of the headers.

In one example, each of the tubular members comprises a substantially straight, substantially horizontal pipe. In another example, each of the headers comprises a substantially straight, substantially vertical pipe. The reactor can comprise at least two, at least three, at least four, at least five, at least six, at least seven, or more tubular members.

In one example, each of the tubular members has a length-to-diameter (L:D) ratio in the range of from about 2:1 to about 50:1, about 5:1 to about 20:1, or 8:1 to 15:1 and each of the headers has a height-to-width (H:W) ratio in the range of from about 2:1 to about 20:1, about 4:1 to about 15:1, or 5:1 to 10:1. Examples of the present invention include, in addition to the previously recited L:D and H:W, L in the range of from about 10 to about 200 feet, about 20 to about 100 feet or 30 to 50 feet and D in the range of from about 1 to about 20 feet, about 2 to about 10 feet, or 3 to 5 feet; D:W ratio in the range of about 0.1:1 to about 2:1, about 0.25:1 to about 1:1, or 0.4:1 to 0.9:1; and/or the maximum depth of the reaction medium in the tubular member less than about 0.8D, less than about 0.4D, or less than 0.25D. The maximum depth of the reaction medium on bottom of each tubular member can be about 1 to about 40 inches, about 1 to about 32 inches, or 1 to 24 inches.

In one example, each of the tubular members defines an inlet located at one of the headers and an outlet located at the other header. The reaction medium can flow downwardly through the headers as the reaction medium travels from the outlet of an upper one of the tubular members to the inlet of a lower one of the tubular members. In one example, the reactor comprises at least one, at least two, at least three, at least four, at least five, at least six, at least seven, or more flow diverters at least partially disposed within at least one of the headers to direct the flow of the reaction medium from the outlet of an upper one of the tubular members to the inlet of a lower one of the tubular members. In another example a plurality of flow diverters are disposed in each header. In another example the chemical reaction generates a vapor byproduct, wherein a vapor gap is defined between vertically adjacent ones of the flow diverters in at least one of the headers, wherein the vapor byproduct generated in at least one tubular member passes out of the tubular member, through the vapor gap, and out of at least one of the headers via a vapor outlet located near the top of at least one of the headers.

In another example the reaction medium comprises a foam portion and a predominately liquid portion, each comprising the liquid. In one example, a portion of the reaction medium located in an uppermost one of the reactor segments comprises at least 50 volume percent vapor and a portion of the reaction medium located in a lowermost one of the reactor segments comprises less than 20 volume percent vapor.

In one example, the chemical reaction comprises polycondensation wherein the average chain length of the reaction medium increases by at least 10 in the reactor and the reaction medium comprises a polyester polymer or copolymer that is at least partly formed by the polycondensation. In one example, the polyester polymer or copolymer comprises polyethylene terephthalate, Additionally, the process can comprise introducing a polycondensation feed into the feed inlet of the reactor, wherein the polycondensation feed forms the reaction medium in the reactor. The polycondensation feed can have an average chain length in the range of from about 5 to about 50, about 8 to about 40, or 10 to 30.

In another example of the present invention, there is provided a process comprising subjecting a reaction medium to an esterification and/or polycondensation reaction in a reactor comprising a pair of horizontally spaced vertically elongated headers and a plurality of vertically spaced horizontally elongated tubular members coupled to and extending generally between the headers. The reaction medium flows through the headers and the tubular members as the reaction medium travels through the reactor. The detailed description of FIG. 1 reactor 10 employed as a second stage esterification, prepolymerization, and/or finisher reactor given above applies to this example of the present invention. Specifically the feed characteristics (e.g., conversion and/or chain length), temperature, pressure, conversion increase, average chain length increase, product characteristics, and any heat input all apply to this example of the present invention.

In one example, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln \eta_r)/C$$

where
$\eta_{int}$=Intrinsic viscosity
$\eta_r$=Relative viscosity=$t_s/t_o$
$\eta_{sp}$=Specific viscosity=$\eta_r-1$ The intrinsic viscosity (It.V. or $\eta_{int}$) may be estimated using the Billmeyer equation as follows:

$$\eta_{int}=0.5\,[e^{0.5 \times Ih.V.}-1]+(0.75 \times Ih.V.)$$

The reference for estimating intrinsic viscosity (Billmeyer relationship) is J. *Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a process for making polyethylene terephthalate (PET), the process comprising: (a) introducing a polycondensation feed into a polycondensation reactor, wherein the polycondensation feed forms a predominately liquid reaction medium in the reactor, wherein the polycondensation feed comprises PET having an average chain length in the range of from about 5 to about 50, about 8 to about 40, or 10 to 30; (b) subjecting the reaction medium to polycondensation in the reactor, wherein the reactor comprises a pair of horizontally spaced vertically elongated headers and a plurality of vertically spaced horizontally elongated pipes coupled to and extending generally between the headers, wherein the reaction medium flows through the headers and the pipes as the reaction medium travels through the reactor, wherein the reaction medium flows in generally opposite directions in vertically adjacent ones of the pipes, wherein the reaction medium flows downwardly through the headers as the reaction medium travels from one of the pipes to another of the pipes; and (c) recovering a predominately liquid polycondensation product from the reactor, wherein the polycondensation product comprises PET having an average chain length that is at least about 10, at least about 25, at least 50 greater than the average chain length of the PET in the polycondensation feed.

In one example, the pipes are substantially horizontal and each of the headers comprises a substantially vertical pipe. In another example, the reactor comprises at least three, at least four, at least five, at least six, at least seven, or more of the pipes, each directly coupled to the headers. In one example, each of the pipes has a length-to-diameter (L:D) ratio in the range of from about 2:1 to about 50:1, about 5:1 to about 20:1, or 8:1 to 15:1 and each of the headers has a height-to-width (H:W) ratio in the range of from about 2:1 to about 20:1, about 4:1 to about 15:1, or 5:1 to 10:1. Additionally, L can be in the range of from about 10 to about 200 feet, about 20 to about 100 feet, or 30 to 50 feet and D can be in the range of from about 1 to about 20 feet, about 2 to about 10 feet, or 3 to 5 feet.

In one example, the reactor comprises at least three, at least four, at least five, at least six, or at least seven pipes and has a diameter-to-width (D:W) ratio in the range of from about 0.1:1 to about 2:1, about 0.25:1 to about 1:1, or 0.4:1 to 0.9:1.

In one example, the reactor comprises a plurality of flow diverters at least partially disposed within each of the headers, wherein the flow diverters direct the flow of the reaction medium downwardly from one of the pipes to another of the pipes.

In another example, the polycondensation causes the formation of a vapor byproduct, wherein the vapor byproduct is discharged from the reactor via vapor outlets located near the top of each of the headers, wherein the polycondensation product is recovered from a liquid outlet located near the bottom of at least one of the headers.

In one example, the polycondensation feed comprises PET having an average chain length in the range of from about 8 to about 40, wherein the polycondensation product comprises PET having an average chain length that is at least about 25 greater than the average chain length of the PET in the polycondensation feed.

In one example, the polycondensation feed is maintained at a temperature in the range of from about 265 to about 305° C., wherein the vapor space pressure in the reactor is maintained in the range of from about 1 to about 20 torr.

In one example, the It.V. of the polycondensation feed is in the range of from about 0.1 to about 0.5, about 0.1 to about 0.4, or about 0.15 to about 0.35 dL/g. In one example, the It.V. of or polycondensation product is in the range of from about 0.3 to about 1.2, about 0.35 to about 0.6, or 0.4 to 0.5 dL/g.

In a further embodiment of the present invention, there is provided a reactor for processing a reaction medium flowing therethrough. The reactor comprises a pair of horizontally spaced vertically elongated headers, a plurality of vertically spaced horizontally elongated tubular members coupled to and extending generally between the headers, and a plurality of flow diverters at least partly disposed in the headers. Each of the tubular members has an inlet located at one of the headers and an outlet located at the other of the headers. The flow diverters are configured to direct the flow of the reaction medium downwardly from the outlet of one of the tubular members to the inlet of another of the tubular members.

In one example, the reactor is configured such that the reaction medium flows in generally opposite directions in vertically adjacent ones of the tubular members. In one example, the reactor comprises at least three, at least four, at least five, at least six, at least seven, or more of the tubular members.

In another example, each of the tubular members comprises a substantially straight, substantially horizontal pipe. Additionally, each of the headers can comprise a substantially straight, substantially vertical pipe.

In one example, each of the tubular members has a length-to-diameter (L:D) ratio in the range of from about 2:1 to about 50:1, about 5:1 to about 20:1, or 8:1 to 15.1. Additionally, each of the headers can have a height-to-width (H:W) ratio in the range of from about 2:1 to about 20:1, about 4:1 to about 15:1, or 5:1 to 10:1. In one example, L is additionally in the range of from about 10 to about 200 feet, about 20 to about 100 feet, or 30 to 50 feet and D is in the range of from about 1 to about 20 feet, about 2 to about 10 feet, or 3 to 5 feet. In another example the reactor also has a D:W ratio in the range of from about 0.1:1 to about 2:1, about 0.25:1 to about 1:1, or 0.4:1 to 0.9:1.

In one example, the reactor defines a vapor outlet located near the top of at least one of the headers and a liquid outlet located near the bottom of at least one of the headers. In another example, each of the headers defines a vapor outlet located near the top of the headers. The reactor can define a feed inlet near the top of at least one of the headers.

In one example, a plurality of the flow diverters are disposed in each of the headers. In one example, a vapor gap is defined between vertically adjacent ones of the flow diverters in at least one of the headers.

Numerical Ranges

The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromotagraphy (GPC) measurements and/or viscosity measurements.

As used herein, the terms "comprising," "comprises," and "comprise" are open-ended transition terms used to transition from a subject recited before the term to one or more elements recited after the term, where the element or more elements listed after the transition term are not necessarily the only elements that make up the subject.

As used herein, the terms "containing," "contains," and "contain" have the same open-ended meaning as "comprising," "comprises," and "comprise," provided below.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "directly coupled" refers to a manner of coupling two vessels in fluid flow communication with one another without the use of an intermediate connector having a substantially narrower diameter than the two vessels.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vapor byproduct" includes the vapor generated by a desired chemical reaction (i.e., a vapor coproduct) and any vapor generated by other reactions (i.e., side reactions) of the reaction medium.

As used herein, the term "vertically elongated" means that the maximum vertical dimension is larger than the maximum horizontal dimension.

Claims not Limited to Disclosed Embodiments

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: introducing a polycondensation feed into a polycondensation reactor, wherein said polycondensation feed comprises PET and forms a reaction medium in said reactor, subjecting said reaction medium to a polycondensation reaction in said reactor comprising a pair of horizontally spaced vertically elongated headers and a plurality of vertically spaced horizontally elongated tubular members coupled to and extending between said headers, wherein said reaction medium flows through said headers and said tubular members as said reaction medium travels through said reactor.

2. The process of claim 1, wherein said reaction medium flows horizontally through said tubular members.

3. The process of claim 1, wherein said reaction medium flows in opposite directions in vertically adjacent ones of said tubular members.

4. The process of claim 1, wherein said reaction medium flows downwardly through at least one of said headers as said reaction medium travels from an upper one of said tubular members to a lower one of said tubular members.

5. The process of claim 1, wherein said polycondensation chemical reaction generates a vapor byproduct, wherein at least a portion of said vapor byproduct generated in at least two of said tubular members is combined in at least one of said headers and exits a vapor outlet located near the top of said at least one of said headers.

6. The process of claim 1, wherein a liquid product of said polycondensation reaction exits said reactor via a liquid outlet located near the bottom of at least one of said headers.

7. The process of claim 1, wherein all of said tubular members comprise a substantially straight, substantially horizontal pipe.

8. The process of claim 1, wherein all of said headers comprise a substantially straight, substantially vertical pipe.

9. The process of claim 1, wherein said reactor comprises at least three of said tubular members.

10. The process of claim 1, wherein all of said tubular members have a length-to-diameter (L:D) ratio in the range of from about 2:1 to about 50:1, wherein all of said headers have a height-to-width (H:W) ratio in the range of from about 2:1 to about 20:1.

11. The process of claim 10, wherein L is in the range of from about to about 200 feet and D is in the range of from about 1 to about 20 feet.

12. The process of claim 10, wherein said reactor has a D:W ratio in the range of from about 0.1:1 to about 2:1.

13. The process of claim 10, wherein the maximum depth of said reaction medium in said tubular members is less than about 0.8D.

14. The process of claim 1, wherein all of said tubular members define an inlet located at one of said headers and an outlet located at the other of said headers.

15. The process of claim 14, wherein said reaction medium flows downwardly through said headers as said reaction medium travels from the outlet of an upper one of said tubular members to the inlet of a lower one of said tubular members.

16. The process of claim 15, wherein said reactor further comprises a plurality of flow diverters at least partially disposed within at least one of said headers, wherein said flow diverters direct the flow of said reaction medium from the outlet of said upper one of said tubular members to the inlet of said lower one of said tubular members.

17. The process of claim 16, wherein said polycondensation reaction generates a vapor byproduct, wherein a vapor gap is defined between vertically adjacent ones of said flow diverters in said at least one of said headers, wherein said vapor byproduct generated in at least one of said tubular members passes out of said at least one of said tubular members, through said vapor gap, and out of said at least one of said headers via a vapor outlet located near the top of said at least one of said headers.

18. The process of claim 16, wherein a plurality of said flow diverters are disposed in each of said headers.

19. The process of claim 1, wherein all of said headers extend within 30 degrees of vertical.

20. The process of claim 1, wherein all of said tubular members extend within 30 degrees of horizontal.

21. The process of claim 1, wherein said reaction medium comprises a liquid within which said polycondensation reaction is carried out.

22. The process of claim 21, wherein said reaction medium comprises a foam portion and a predominately liquid portion, each comprising said liquid.

23. The process of claim 1, wherein the average chain length of said PET in said reaction medium increases by at least about 10 in said reactor.

24. The process of claim 23, wherein said PET in said polycondensation feed has an average chain length in the range of from about 5 to about 50.

25. The process of claim 24, wherein said polycondensation feed is maintained at a temperature in the range of from about 220 to about 350° C., wherein the vapor space pressure in said reactor is maintained in the range of from about 0 to about torr.

26. The process of claim 1, wherein a portion of said reaction medium located in an uppermost one of said tubular members comprises at least 50 volume percent vapor and a portion of said reaction medium located in a lowermost one of said tubular members comprises less than 20 volume percent vapor.

27. The process of claim 1, wherein said PET is a PET copolymer comprising at least about 90 mole percent ethylene terephthalate repeat units and up to about 10 mole percent of added comonomer repeat units.

28. The process of claim 27, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

29. The process of claim 28, wherein said added comonomer comprises isophthalic acid.

30. The process of claim 6, wherein said PET in said liquid product of said polycondensation reaction exits said reactor at a rate of at least about 10,000 pounds per hour.

31. The process of claim 1, wherein the average chain length of said PET in said reaction medium increases by at least about 2 in said reactor.

32. The process of claim 31, wherein said PET in said polycondensation feed has an average chain length in the range of from about 1 to about 20.

33. The process of claim 32, wherein said polycondensation feed is maintained at a temperature in the range of from about 220 to about 350° C., wherein the vapor space pressure in said reactor is maintained in the range of from about 0 to about 300 torr.

34. The process of claim 1, wherein said reactor comprises no mechanical mixing device.

35. A process for making polyethylene terephthalate (PET), said process comprising:
(a) introducing a polycondensation feed into a polycondensation reactor, wherein said polycondensation feed forms a predominately liquid reaction medium in said reactor, wherein said polycondensation feed comprises PET having an average chain length in the range of from about 5 to about 50;
(b) subjecting said reaction medium to a polycondensation reaction in said reactor, wherein said reactor comprises a pair of horizontally spaced vertically elongated headers and a plurality of vertically spaced horizontally elongated pipes coupled to and extending between said headers, wherein said reaction medium flows through said headers and said pipes as said reaction medium travels through said reactor, wherein said reaction medium flows in opposite directions in vertically adjacent ones of said pipes, wherein said reaction medium flows downwardly through said headers as said reaction medium travels from one of said pipes to another of said pipes; and
(c) recovering a predominately liquid polycondensation product from said reactor, wherein said polycondensation product comprises PET having an average chain length that is at least about 10 greater than the average chain length of the PET in said polycondensation feed.

36. The process of claim 35, wherein said pipes are substantially horizontal, wherein all of said headers comprise a substantially vertical pipe.

37. The process of claim 35, wherein said reactor comprises at least three of said pipes, all directly coupled to said headers.

38. The process of claim 35, wherein all of said pipes have a length-to-diameter (L:D) ratio in the range of from about 2:1 to about 50:1, wherein all of said headers have a height-to-width (H:W) ratio in the range of from about 2:1 to about 20:1.

39. The process of claim 38, wherein L is in the range of from about to about 200 feet and D is in the range of from about 1 to about 20 feet.

40. The process of claim 37, wherein said reactor has a D:W ratio in the range of from about 0.1:1 to about 2:1.

41. The process of claim 35, wherein said reactor comprises a plurality of flow diverters at least partially disposed within each of said headers, wherein said flow diverters direct the flow of said reaction medium downwardly from said one of said pipes to said another of said pipes.

42. The process of claim 35, wherein said polycondensation reaction causes the formation of a vapor byproduct, wherein said vapor byproduct is discharged from said reactor via vapor outlets located near the top of all of said headers, wherein said polycondensation product is recovered from a liquid outlet located near the bottom of at least one of said headers.

43. The process of claim 35, wherein said polycondensation feed comprises PET having an average chain length in the range of from about 8 to about 40, wherein said polycondensation product comprises PET having an average chain length that is at least about 25 greater than the average chain length of the PET in said polycondensation feed.

44. The process of claim 35, wherein said polycondensation feed is maintained at a temperature in the range of from about 265 to about 305° C., wherein the vapor space pressure in said reactor is maintained in the range of from about 1 to about torr.

45. A reactor for processing a reaction medium flowing therethrough, said reactor comprising: a pair of horizontally spaced vertically elongated headers, a plurality of vertically spaced horizontally elongated tubular members coupled to and extending between said headers, and a plurality of flow diverters at least partly disposed in said headers, wherein all of said tubular members have an inlet located at one of said headers and an outlet located at the other of said headers, wherein said flow diverters are configured to direct the flow of said reaction medium downwardly from the outlet of one of said tubular members to the inlet of another of said tubular members.

46. The reactor of claim 45, wherein said reactor is configured such that said reaction medium flows in opposite directions in vertically adjacent ones of said tubular members.

47. The reactor of claim 45, wherein said reactor comprises at least three of said tubular members.

48. The reactor of claim 45, wherein all of said tubular members comprise a substantially straight, substantially horizontal pipe.

49. The reactor of claim 48, wherein all of said headers comprise a substantially straight, substantially vertical pipe.

50. The reactor of claim 45, wherein all of said tubular members have a length-to-diameter (L:D) ratio in the range of from about 2:1 to about 50:1.

51. The reactor of claim 50, wherein all of said headers have a height-to-width (H:W) ratio in the range of from about 2:1 to about 20:1.

52. The reactor of claim 51, wherein L is in the range of from about to about 200 feet and D is in the range of from about 1 to about 20 feet.

53. The reactor of claim 52, wherein said reactor has a D:W ratio in the range of from about 0.1:1 to about 2:1.

54. The reactor of claim 45, wherein said reactor defines a vapor outlet located near the top of at least one of said headers and a liquid outlet located near the bottom of at least one of said headers.

55. The reactor of claim 45, wherein all of said headers define a vapor outlet located near the top of said headers.

56. The reactor of claim 45, wherein said reactor defines a feed inlet near the top of at least one of said headers.

57. The reactor of claim 45, wherein a plurality of said flow diverters are disposed in each of said headers.

58. The reactor of claim 45, wherein a vapor gap is defined between vertically adjacent ones of said flow diverters in at least one of said headers.

59. The process of claim 1, wherein said PET in said polycondensation feed has an It.V. in the range of from about 0.1 to about 0.5 dL/g.

60. The process of claim 1, further comprising removing a polycondensation product from a product outlet of said reactor, wherein said reaction medium forms said polycondensation product in said reactor, wherein the It.V. of said PET in said polycondensation product is in the range of from about 0.3 to about 1.2 dL/g.

61. The process of claim 24, further comprising removing a polycondensation product from a product outlet of said reactor, wherein said reaction medium forms said polycondensation product, wherein the It.V. said PET in of said polycondensation product is in the range of from about 0.3 to about 1.2 dL/g.

62. The process of claim 35, wherein the It.V. of said PET in said polycondensation feed is in the range of from about 0.1 to about 0.5 dL/g.

63. The process of claim 35, wherein the It.V. of said PET in said polycondensation product is in the range of from about 0.3 to about 1.2 dL/g.

* * * * *